(12) United States Patent
Sugimoto (10) Patent No.: US 9,073,507 B2
(45) Date of Patent: Jul. 7, 2015

(54) STEERING LOCK DEVICE

(71) Applicant: ALPHA CORPORATION, Yokohama-shi, Kanagawa (JP)

(72) Inventor: Koichiro Sugimoto, Yokohama (JP)

(73) Assignee: ALPHA CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 14/391,816

(22) PCT Filed: Mar. 22, 2013

(86) PCT No.: PCT/JP2013/058262
§ 371 (c)(1),
(2) Date: Oct. 10, 2014

(87) PCT Pub. No.: WO2013/161465
PCT Pub. Date: Oct. 31, 2013

(65) Prior Publication Data
US 2015/0068358 A1    Mar. 12, 2015

(30) Foreign Application Priority Data

Apr. 27, 2012    (JP) .................................. 2012-102963

(51) Int. Cl.
*B60R 25/02* (2013.01)
*B60R 25/023* (2013.01)
*B60R 25/0215* (2013.01)

(52) U.S. Cl.
CPC ........... *B60R 25/023* (2013.01); *B60R 25/0215* (2013.01); *B60R 25/02153* (2013.01)

(58) Field of Classification Search
CPC .. B60R 25/02; B60R 25/021; B60R 25/0211; B60R 25/02113; B60R 25/02115; B60R 25/02121; B60R 25/02126; B60R 25/02128; B60R 25/02142; B60R 25/02153; B60R 25/023
USPC ............................ 70/186, 182–185, 187, 252
See application file for complete search history.

(56) References Cited

U.S. PATENT DOCUMENTS 8,474,291 B2 * 7/2013 Trischberger et al. .......... 70/186
8,925,416 B2 * 1/2015 Okada et al. .................... 74/495
(Continued)

FOREIGN PATENT DOCUMENTS

| JP | 2002-120695 A | 4/2002 |
| JP | 2009-248843 A | 10/2009 |
| WO | 2010/029990 A1 | 3/2010 |

OTHER PUBLICATIONS

English Translation of International Preliminary Report on Patentability for PCT/JP2013/058262 dated Oct. 28, 2014.

*Primary Examiner* — Lloyd Gall
(74) *Attorney, Agent, or Firm* — Nath, Goldberg & Meyer; Jerald L. Meyer; Stanley N. Protigal (57) ABSTRACT

An auxiliary lock structure (6) includes: an auxiliary lock member (61) arranged inside a frame (2) and configured to shift between an auxiliary lock position to engage with a lock member (5) and prevent a shift of the lock member (5) and an auxiliary lock release position to allow the shift of the lock member (5); an auxiliary biasing unit (62) configured to bias the auxiliary lock member (61) from the auxiliary lock release position toward the auxiliary lock position; and a trigger (31) provided on an inner surface of a cover (3) mounted to the frame (2), and configured to engage with the auxiliary biasing unit (62) and hold the auxiliary lock member (61) in the auxiliary lock release position.

4 Claims, 9 Drawing Sheets

(56) References Cited

U.S. PATENT DOCUMENTS

| | | | |
|---|---|---|---|
| 2002/0023468 A1* | 2/2002 | Frick et al. | 70/185 |
| 2004/0075232 A1* | 4/2004 | Zillmann | 280/89 |
| 2009/0064739 A1* | 3/2009 | Trischberger et al. | 70/237 |
| 2009/0139285 A1* | 6/2009 | Tanioka | 70/209 |
| 2010/0064742 A1* | 3/2010 | Okada et al. | 70/185 |
| 2011/0167885 A1* | 7/2011 | Sugimoto | 70/186 |

* cited by examiner

STEERING LOCK DEVICE

TECHNICAL FIELD

The present invention relates to a steering lock device for preventing rotation of the steering shaft of an automobile.

BACKGROUND ART

Figure 1:
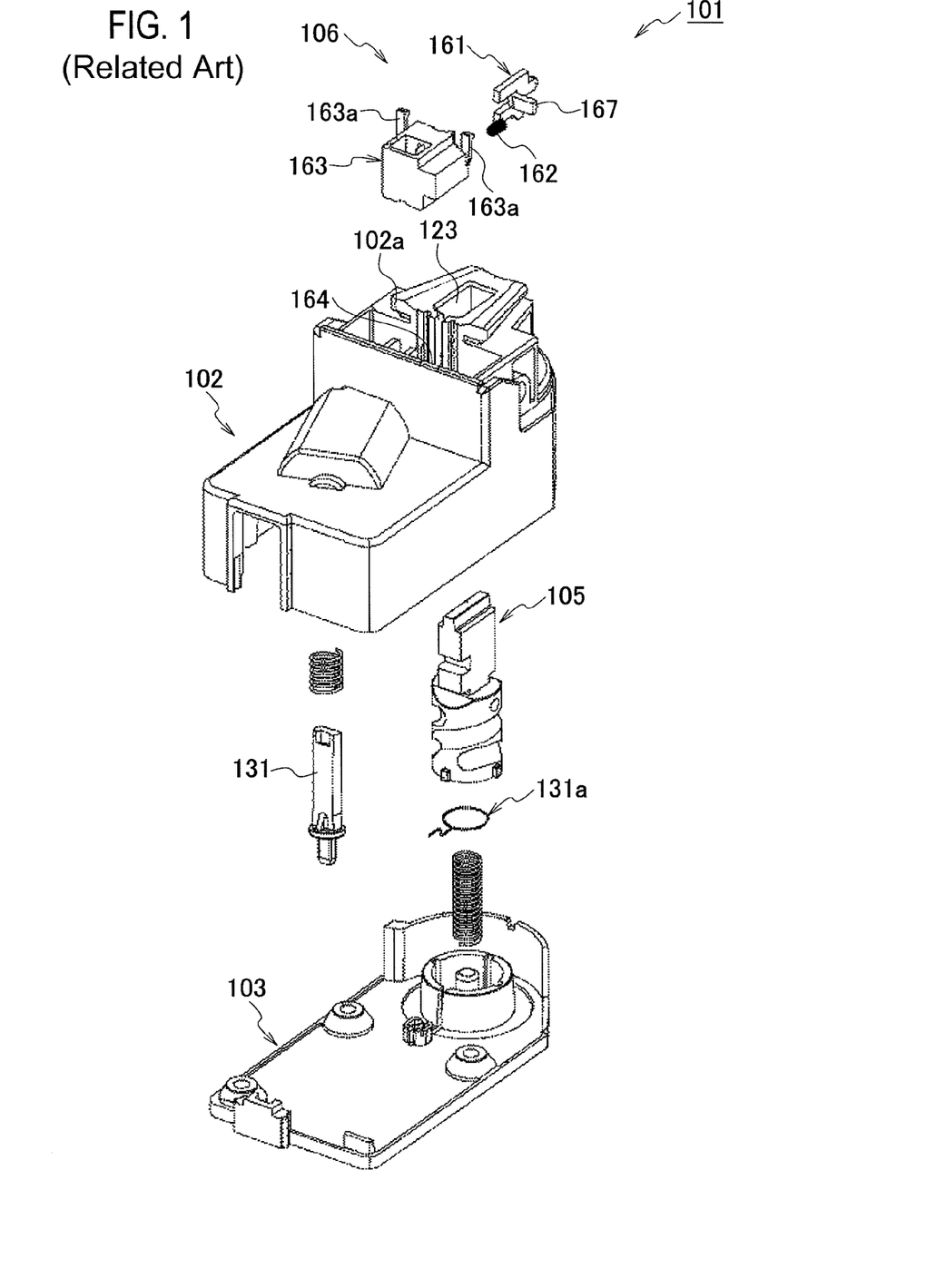
FIG. 1 is an exploded perspective view illustrating a related steering lock device.

A steering lock device is disclosed in Patent Literature 1. As illustrated in FIG. 1, this steering lock device 101 includes, inside a frame 102 and a frame cover 103, a lock bolt 105 capable of moving between a lock position in which the lock bolt is engaged with a steering shaft (not illustrated) and an unlock position in which the engagement is released, and an auxiliary lock structure 106 configured to prevent movement of the lock bolt 105 in the lock position. The auxiliary lock structure 106 includes: an auxiliary lock member 161 biased by the biasing force of a coil spring 162 from a disengagement position in which the auxiliary lock member 161 is not engaged with the lock bolt 105 in the lock position toward an engagement position in which the auxiliary lock member 161 is engaged with the lock bolt 105; a stopper member 131 engaged with the auxiliary lock member 161 to thereby hold the auxiliary lock member 161 in the disengagement position; and a holding member 131a engaged with the stopper member 131 to thereby hold the stopper member 131 in a prevention position. The stopper member 131 is arranged in such a way as to be movable between the prevention position in which the stopper member 131 is engaged with the auxiliary lock member 161 and an open position in which the engagement is released. The holding member 131a is mounted in such a way as to be capable of falling to the inner surface of the frame 102 or the frame cover 103.

With the holding member 131a mounted in such a way as to be capable of falling to the inner surface of the frame 102 or the frame cover 103, the holding member 131a, upon an improper unlocking action such as a destructive action from outside, falls from the frame cover 103 and thus releases the hold of the stopper member 131, so that the stopper member 131 and the auxiliary lock member 161 are actuated. In this way, even if part of the frame 102 or the frame cover 103 is destroyed, the lock bolt 105 can still be held in the lock position. Thus, antitheft security is improved.

CITATION LIST

Patent Literature

PTL 1: Japanese Unexamined Patent Application Publication No. 2009-248843

SUMMARY OF INVENTION

Meanwhile, the above-described auxiliary lock structure 106 is mounted to the frame 102 from the steering shaft side with the auxiliary lock member 161 and the coil spring 162 accommodated in a unit case 163. The structure of the auxiliary lock member 161 is such that a spring receiving portion 167 is formed by bending a plate-shaped member, and the coil spring 162 is arranged between the inner wall of the unit case 163 and the spring receiving portion 167. Thus, an auxiliary lock unit arranging portion 164 having a large opening portion must be provided to arrange the unit case 163. However, when force that tries to turn the steering shaft is applied in a state where the lock bolt 105 is located in the lock position to restrict turn of the steering shaft, a vicinity of a lock bolt inserting hole 123 in the frame 102, in which the unit case 163 is arranged, must receive the force applied to the vicinity of the lock bolt inserting hole 123. For this reason, the opening portion for arranging the unit case 163 needs to be as small as possible in light of maintaining the strength.

An object of the present invention is to provide a steering lock device capable of including an auxiliary lock structure without decreasing the strength of a frame.

A steering lock device in accordance with some embodiments includes: a frame having a lock accommodating hole being a through-hole; a lock member arranged in the lock accommodating hole and configured to shift between a lock position to prevent a rotation of a steering shaft and a lock release position to allow the rotation of the steering shaft; and an auxiliary lock structure configured to prevent a shift of the lock member. The auxiliary lock structure includes: an auxiliary lock member arranged inside the frame and configured to shift between an auxiliary lock position to engage with the lock member and prevent the shift of the lock member and an auxiliary lock release position to allow the shift of the lock member; an auxiliary biasing unit configured to bias the auxiliary lock member from the auxiliary lock release position toward the auxiliary lock position; and a trigger provided on an inner surface of a cover mounted to the frame, and configured to engage with the auxiliary biasing unit and hold the auxiliary lock member in the auxiliary lock release position. The auxiliary lock member is configured to move to the auxiliary lock position upon falling of the trigger and release of the engagement between the trigger and the auxiliary biasing unit.

According to the above-described configuration, the tip of the trigger is engaged with the auxiliary biasing unit to thereby hold the auxiliary lock member in the auxiliary lock release position. Accordingly, it is possible to include the auxiliary lock structure without decreasing the strength of the frame.

The auxiliary biasing unit may be a torsion coil spring with a coil portion arranged on a same plane as a plane on which the auxiliary lock member slides.

According to the above-described configuration, a torsion coil spring as the auxiliary biasing unit is arranged on the same plane as the plane on which the auxiliary lock member slides. In this way, the auxiliary biasing unit and the auxiliary lock member can be arranged with the thickness of the auxiliary biasing unit or the auxiliary lock member. Thus, an opening portion of the unit accommodating chamber can be made small. Accordingly, it is possible to include the auxiliary lock structure without decreasing the strength of the frame.

The auxiliary lock member may include a spring linkage portion, and one end of the torsion coil spring and the spring linkage portion may be in front-rear engagement with each other in a sliding direction of the auxiliary lock member.

According to the above-described configuration, one end of the torsion coil spring and the spring linkage portion are in front-rear engagement with each other in the sliding direction of the auxiliary lock member. This prevents the possibility that the auxiliary lock member may shift to the auxiliary lock position depending upon the direction in which the steering lock device is mounted to the steering shaft. Accordingly, there is no restriction on the direction in which the steering lock device is mounted.

The spring linkage portion may be an elongate hole extending perpendicularly to the sliding direction of the auxiliary lock member.

According to the above-described configuration, the spring linkage portion provided to the auxiliary lock member is an elongate hole extending perpendicularly to the sliding direction of the auxiliary lock member. Accordingly, the one end of the torsion coil spring and the spring linkage portion can be in front-rear engagement with each other in the sliding direction of the auxiliary lock member without making the structure complicated.

DESCRIPTION OF EMBODIMENTS

Hereinbelow, an embodiment of the present invention will be described with reference to drawings. A steering lock device 1 of this embodiment is a device configured to be engaged with a turnably supported steering shaft to selectively prevent turn of the steering shaft. As illustrated in FIGS. 2 to 9, the steering lock device 1 includes a frame 2, a cover 3, a driving unit 4, a lock member 5, and an auxiliary lock structure 6.

Figure 6:
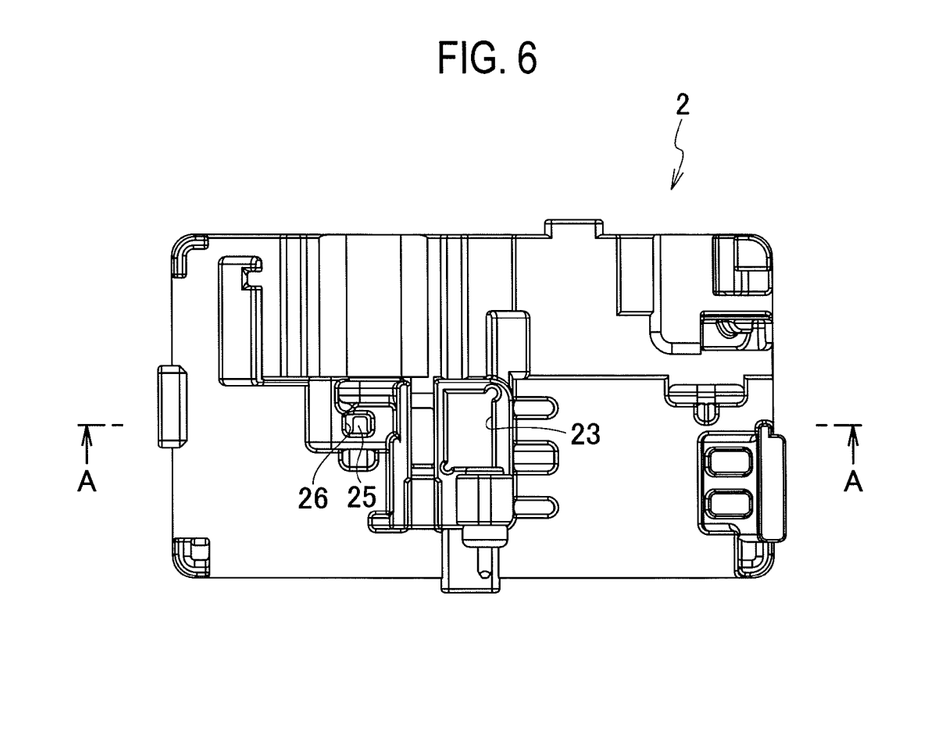
FIG. 6 is a front view illustrating a frame according the one embodiment of the present invention.
Figure 7:
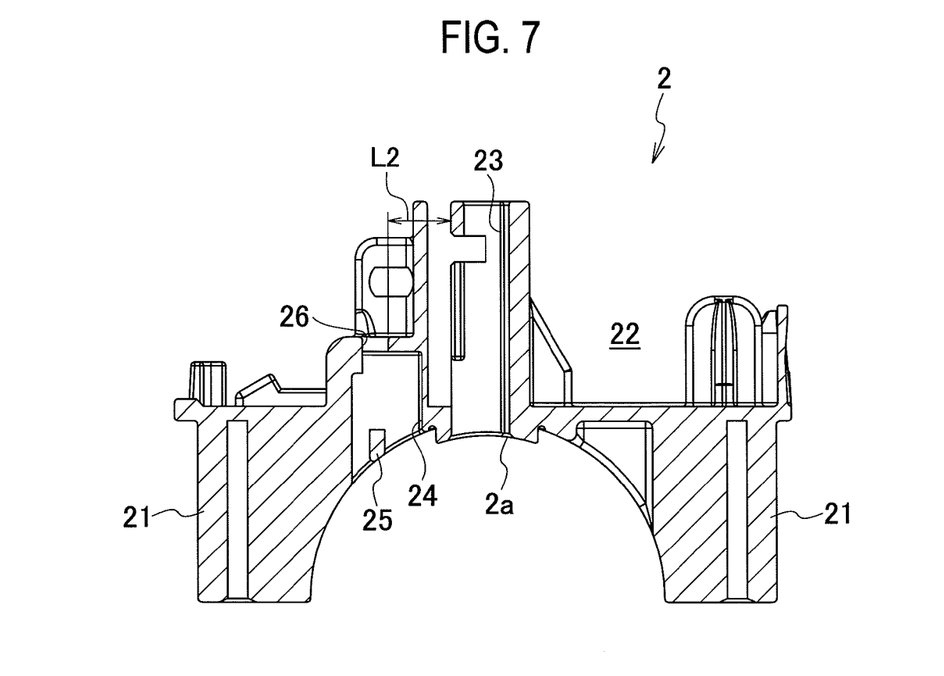
FIG. 7 is a cross-sectional view taken along line A-A in FIG. 6.
Figure 8:
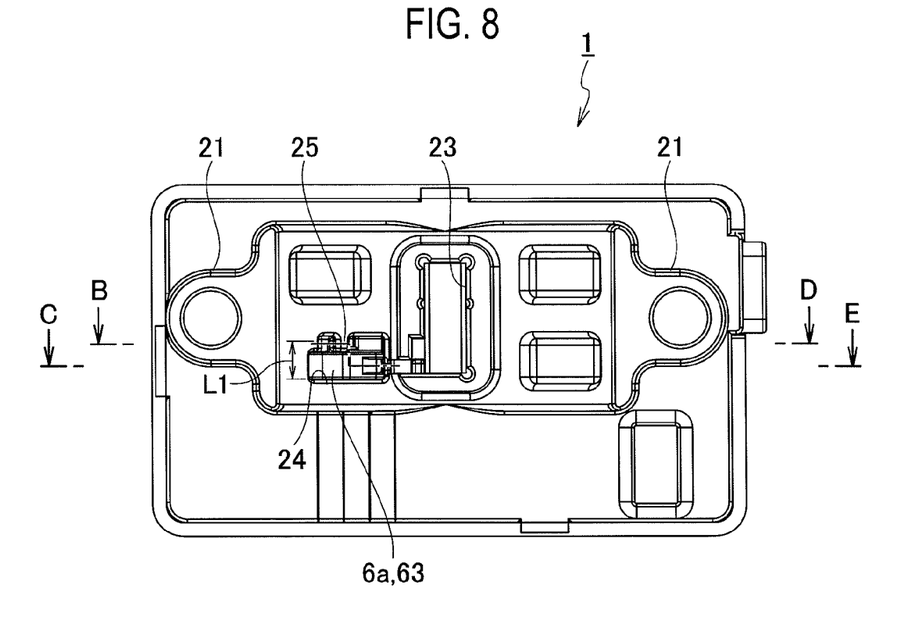
FIG. 8 is a back view illustrating the steering lock device according to the one embodiment of the present invention.

As illustrated in FIGS. 6 and 7, the frame 2 includes a pair of leg portions 21 and is arranged in such a way as to straddle the steering shaft (not illustrated). The frame 2 forms an inner space as a component accommodating chamber 22 together with the cover 3, and the driving unit 4 is arranged in the component accommodating chamber 22. A lock accommodating hole 23 is formed in the frame 2, penetrating therethrough from the component accommodating chamber 22 toward the steering shaft. The lock member 5 is arranged in the lock accommodating hole 23. A unit accommodating chamber 24 is formed in the frame 2 and opens in the vicinity of an opening portion 2a of the lock accommodating hole 23 on the steering shaft side, which will be referred to as one surface side.

The cover 3 is molded with a resin material in a box shape with one face open, and mounted to the frame 2 in such a way as to be capable of falling. A trigger 31 which is a part of the auxiliary lock structure 6 is formed integrally with the inner surface of the cover 3.

The driving unit 4 is formed of an electric motor 41 and a wheel gear 42 and coordinated with the lock member 5. As the electric motor 41 is driven, the wheel gear 42 rotates and thereby shifts the lock member 5.

The lock member 5 is arranged in the lock accommodating hole 23 in such a way as to be capable of shifting between a lock position and a lock release position set inside the lock accommodating hole 23. The tip of the lock member 5 located in the lock position protrudes from the lock accommodating hole 23, thereby preventing rotation of the steering shaft. The tip of the lock member 5 located in the lock release position is accommodated inside the lock accommodating hole 23, thereby allowing rotation of the steering shaft. An auxiliary lock engaging portion 51 being a notch with which a later-described auxiliary lock member 61 can be engaged is provided in a side surface of the lock member 5.

The auxiliary lock structure 6 is a structure configured to be engaged with the lock member 5 located in the lock position to restrict shift of the lock member 5. The auxiliary lock structure 6 is formed of the auxiliary lock member 61, an auxiliary biasing unit 62, a unit case 63, and the trigger 31. The auxiliary lock member 61 and the auxiliary biasing unit 62 are mounted in the unit case 63 to be an auxiliary lock unit, and are arranged in the unit accommodating chamber 24 in such a state.

Figure 2:
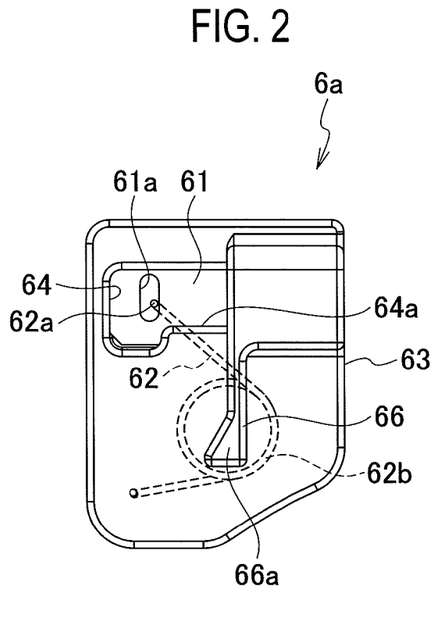
FIG. 2 is a front view illustrating an auxiliary lock unit according to one embodiment of the present invention.
Figure 3:
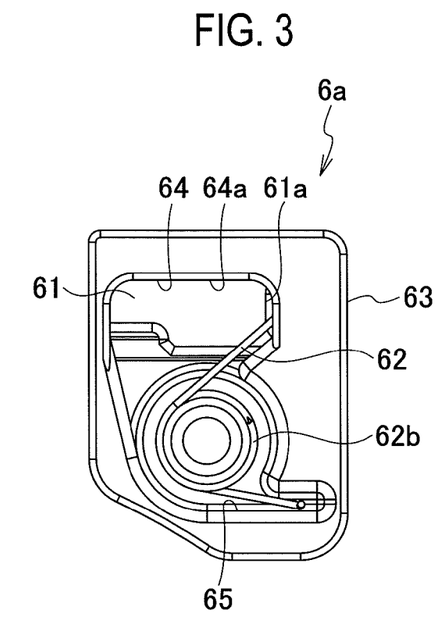
FIG. 3 is a back view of the auxiliary lock unit according to the one embodiment of the present invention.
Figure 4:
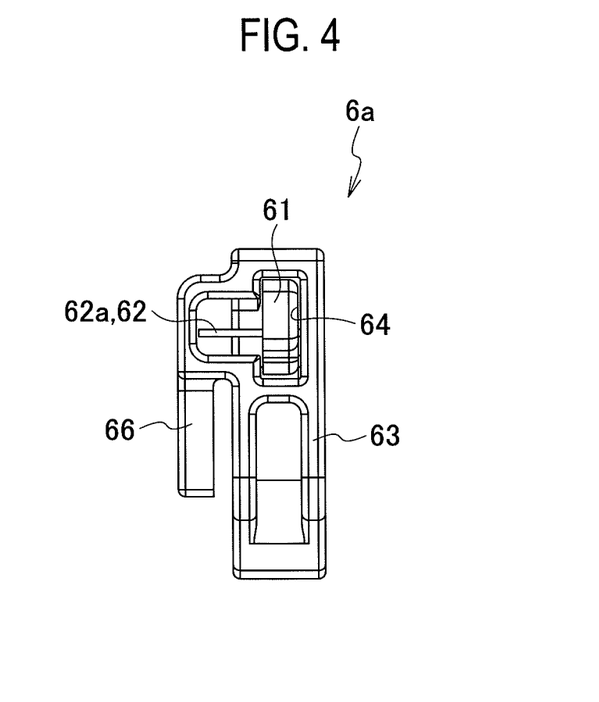
FIG. 4 is a side view of the auxiliary lock unit according to the one embodiment of the present invention.
Figure 5:
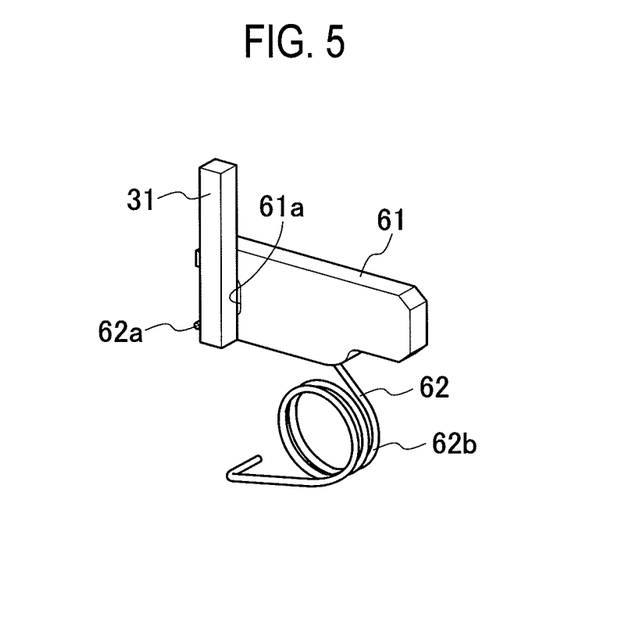
FIG. 5 is a perspective view illustrating an overview of an auxiliary lock structure according to the one embodiment of the present invention.

The unit case 63 is molded with a resin material and includes an auxiliary lock accommodating portion 64, an auxiliary spring accommodating portion 65, and a locking claw 66, as illustrated in FIGS. 2 to 4. The auxiliary lock accommodating portion 64 is formed as a hole portion which opens at a side surface of the unit case 63 and from and into which the auxiliary lock member 61 can protrude and retreat. The auxiliary lock accommodating portion 64 is provided with a unit window 64a at a front wall and at a back wall, and the front side and the back side communicate with each other through the unit window 64a. The auxiliary spring accommodating portion 65 is formed on the back side of the unit case 63 and is formed as a recessed portion following the outer shape of the auxiliary biasing unit 62. The locking claw 66 has a cantilever shape with one end fixed to the front side of the unit case 63. The locking claw 66 is flexible and capable of flexural deformation along the unit case 63. A protrusion engaging portion 66a configured to be engaged with a later-described unit locking protrusion (locking protrusion) 25 is provided at the tip of the locking claw 66.

The auxiliary lock member 61 is formed as a small cuboidal piece made of a prismatic material with a rectangular cross section. The auxiliary lock member 61 is accommodated in the auxiliary lock accommodating portion 64, provided in the unit case 63, in such a way as to be capable of shifting between an auxiliary lock position and an auxiliary lock release position inside the auxiliary lock accommodating portion 64. In the auxiliary lock position, the tip of the auxiliary lock member 61 protrudes from the auxiliary lock accommodating portion 64 and, with the lock member 5 located in the lock position, the tip of the auxiliary lock member 61 is engaged with the auxiliary lock engaging portion 51, thereby preventing shift of the lock member 5 toward the lock release position. In the auxiliary lock release position, the auxiliary lock member 61 retreats to the inside of the auxiliary lock accommodating portion 64, so that the engagement between the tip of the auxiliary lock member 61 and the auxiliary lock engaging portion 51 is released, thereby allowing the shift of the lock member 5. A spring linkage portion 61a is provided at the rear end side of the auxiliary lock member 61. The spring linkage portion 61a is formed as an elongate hole extending perpendicularly to the sliding direction of the auxiliary lock member 61.

The auxiliary biasing unit 62 is formed as a torsion coil spring, and its annular coil portion 62b is arranged on the same plane as the plane on which the auxiliary lock member 61 slides. The auxiliary biasing unit 62 is such that one end of the spring penetrates the unit window 64a and also penetrates the spring linkage portion 61a of the auxiliary lock member 61. Moreover, the penetrating tip is set as a trigger engaging portion 62a protruding from the unit window 64a and engaged with the trigger 31. The other end of the spring of the auxiliary biasing unit 62 is locked in the auxiliary spring accommodating portion 65 of the unit case 63.

The trigger 31 is formed as a shaft-shaped member with one end fixed to the inner surface of the cover 3, and extends in the sliding direction of the lock member 5. In a state where the cover 3 is mounted to the frame 2, the trigger 31 penetrates a later-described trigger inserting hole 26 and its tip protrudes to the inside of the unit accommodating chamber 24.

The unit accommodating chamber 24 is formed such that the unit case 63 accommodated therein will not chatter, and includes the trigger inserting hole 26 and the unit locking protrusion 25. The trigger inserting hole 26 is formed as a through-hole connecting the component accommodating chamber 22 on the other surface side of the frame 2, and the unit accommodating chamber 24 in the sliding direction of the lock member 5, and has a hole shape which the trigger 31 can be inserted in and removed from. The unit locking protrusion 25 is a protrusion protruding from the inner wall of the unit accommodating chamber 24 in such a way as to be cable of being engaged with the protrusion engaging portion 66a of the locking claw 66. The unit locking protrusion 25 is provided at a predetermined portion of the inner wall of the unit accommodating chamber 24 located on an extension of the trigger inserting hole 26 and extends to the edge of the opening of the unit accommodating chamber 24 on the one surface side.

Figure 9:
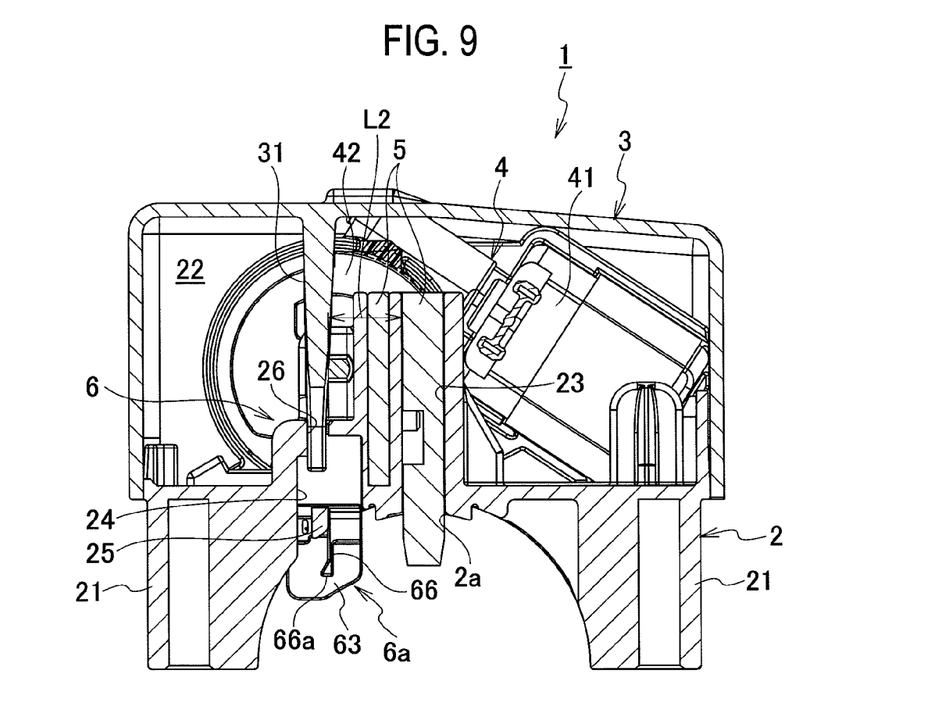
FIG. 9 is a cross-sectional view taken along line B-D in FIG. 8, illustrating a state before mounting the auxiliary lock unit to the frame.

Next, the procedure to mount the auxiliary lock structure 6 will be described. First, as illustrated in FIG. 9, the cover 3 is mounted to the frame 2 to which the lock member 5 and the driving unit 4 are mounted. Here, the trigger 31 is inserted into the trigger inserting hole 26 when the cover 3 is mounted to the frame 2.

Thereafter, the auxiliary lock structure 6 is accommodated in the auxiliary lock accommodating portion 64 of the unit case 63. Then, the one end of the spring of the auxiliary biasing unit 62 is inserted into the spring linkage portion 61a of the auxiliary lock structure 6, and the auxiliary biasing unit 62 is placed into the auxiliary spring accommodating portion 65 of the unit case 63. As a result, an auxiliary lock unit 6a is obtained. An assembly jig (not illustrated) configured to hold the auxiliary lock structure 6 in the auxiliary lock release position against the biasing force of the auxiliary biasing unit 62 is mounted to the auxiliary lock unit 6a. Once the auxiliary lock unit 6a along with the assembly jig is accommodated in the unit accommodating chamber 24, the assembly jig is demounted.

Figure 10:
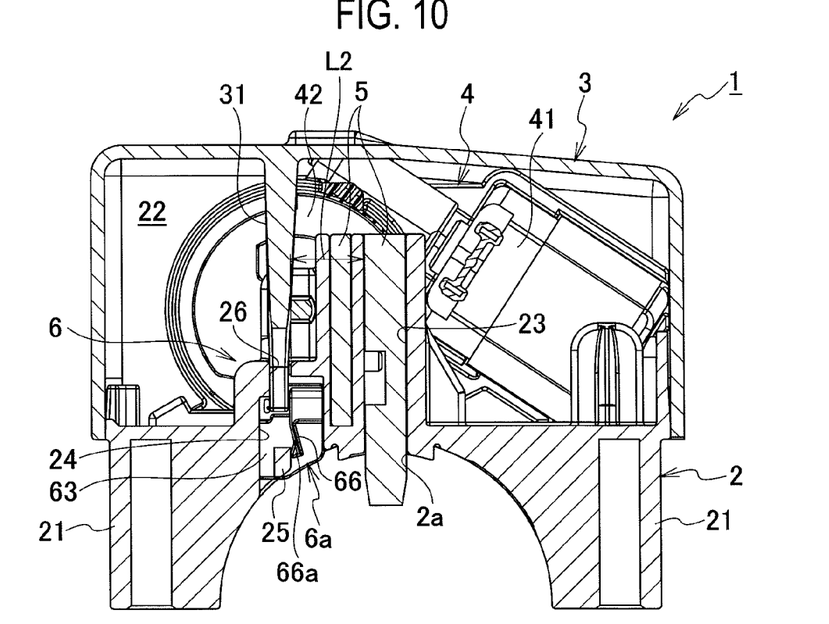
FIG. 10 is a cross-sectional view taken along line B-D in FIG. 8, illustrating a state in the middle of mounting the auxiliary lock unit to the frame.
Figure 11:
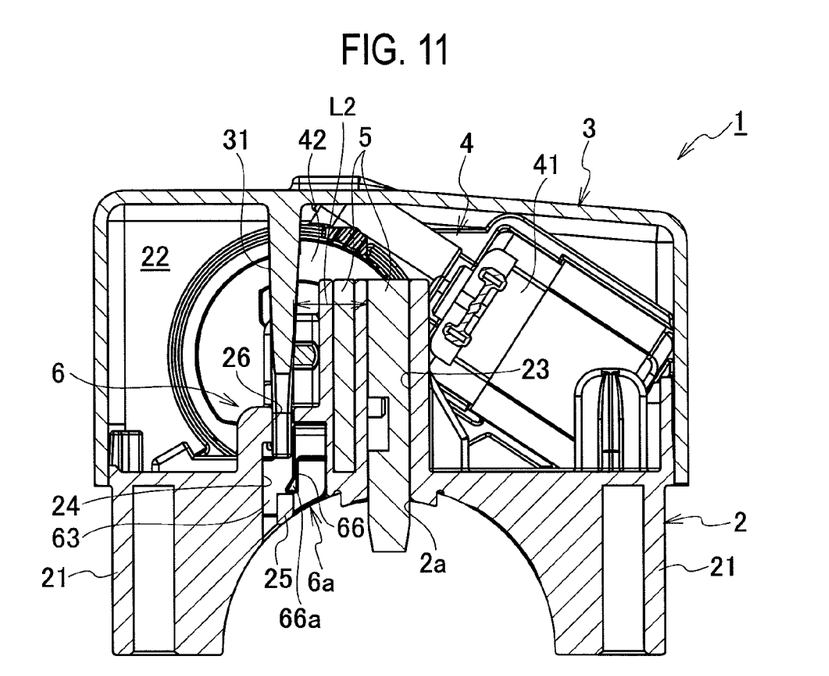
FIG. 11 is a cross-sectional view taken along line B-D in FIG. 8, illustrating a state after mounting the auxiliary lock unit to the frame.

Here, as illustrated in FIG. 10, as the auxiliary lock unit 6a is inserted into the unit accommodating chamber 24, the protrusion engaging portion 66a of the locking claw 66 comes into contact with the unit locking protrusion 25, and the locking claw 66 flexurally deforms in such a way as to move over it. As illustrated in FIG. 11, once the insertion of the auxiliary lock unit 6a into the unit accommodating chamber 24 is completed, the locking claw 66 elastically returns to its original shape, so that the protrusion engaging portion 66a is engaged with the unit locking protrusion 25 in the direction in which the unit case 63 falls from the unit accommodating chamber 24. Engaging the protrusion engaging portion 66a of the unit case 63 and the unit locking protrusion 25 of the unit accommodating chamber 24 allows the unit case 63 to be held inside the unit accommodating chamber 24.

Moreover, since the assembly jig holds the auxiliary lock structure 6 in the auxiliary lock release position, placing the auxiliary lock unit 6a into the unit accommodating chamber 24 allows the trigger engaging portion 62a of the auxiliary biasing unit 62 to be located in a position where it can be engaged with the tip of the trigger 31. When the assembly jig is then pulled out, the trigger engaging portion 62a comes into contact and engagement with the tip of the trigger 31 with the biasing force of the auxiliary biasing unit 62.

Figure 12:
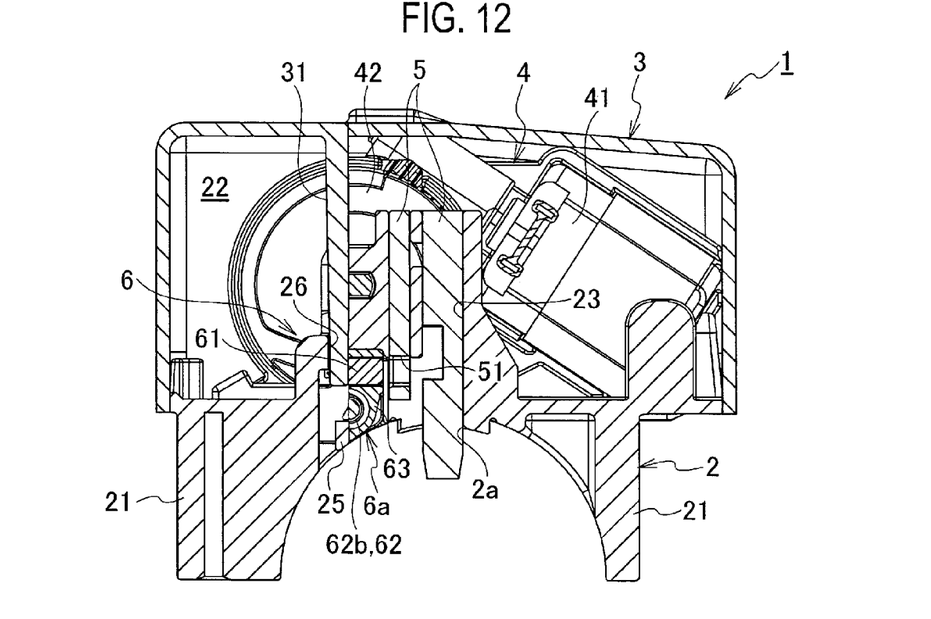
FIG. 12 is a cross-sectional view taken along line B-E in FIG. 8, illustrating a state before actuating the auxiliary lock structure.
Figure 13:
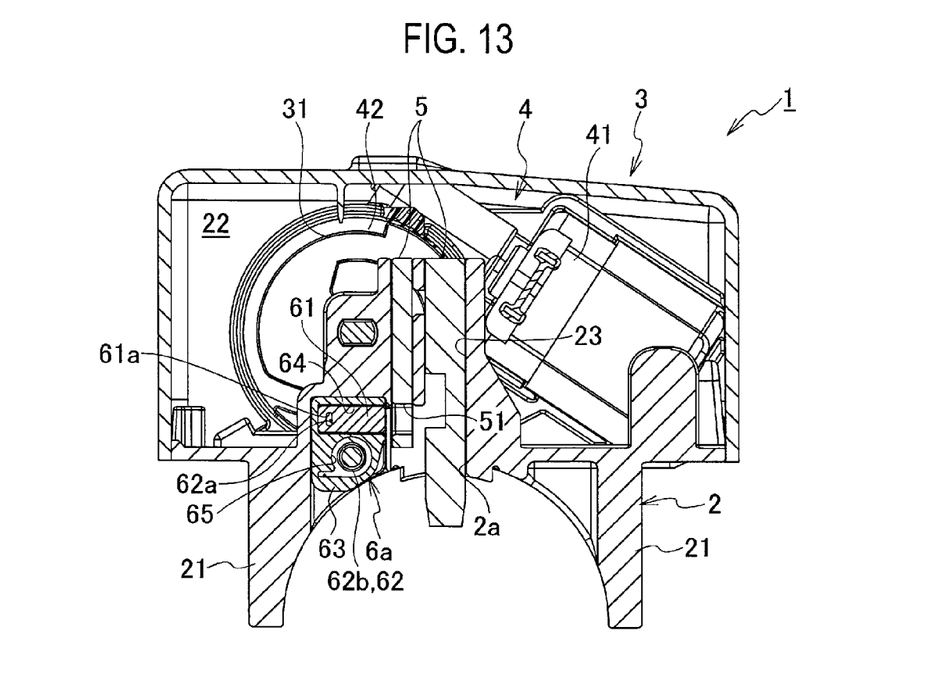
FIG. 13 is a cross-sectional view taken along line C-E in FIG. 8, illustrating the state before actuating the auxiliary lock structure.
Figure 14:
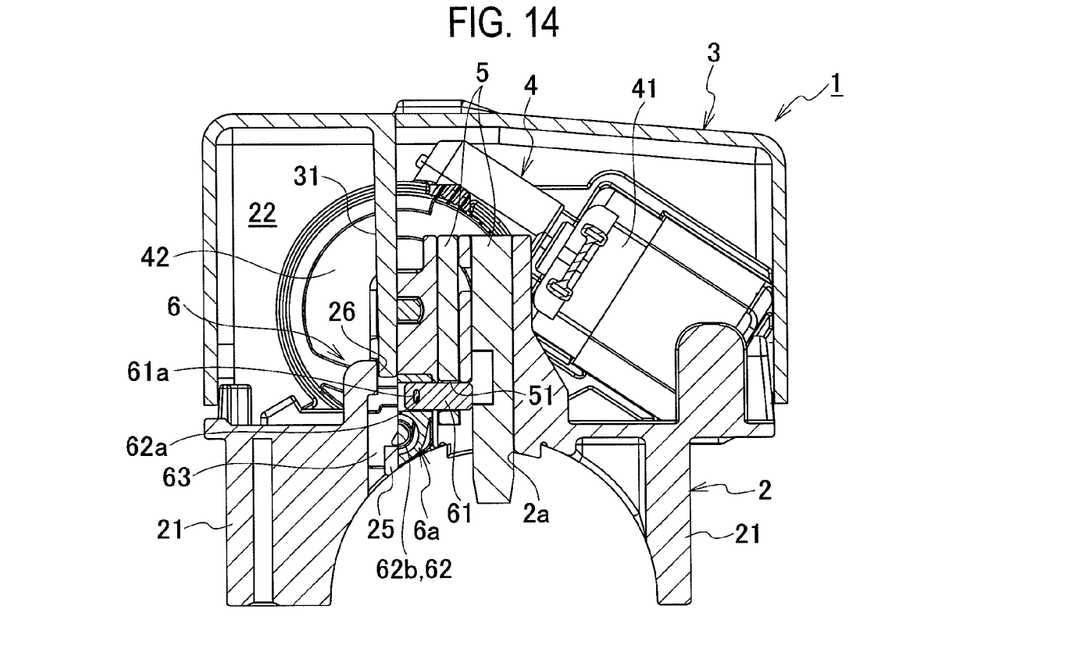
FIG. 14 is a cross-sectional view taken along line B-E in FIG. 8, illustrating a state after actuating the auxiliary lock structure.
Figure 15:
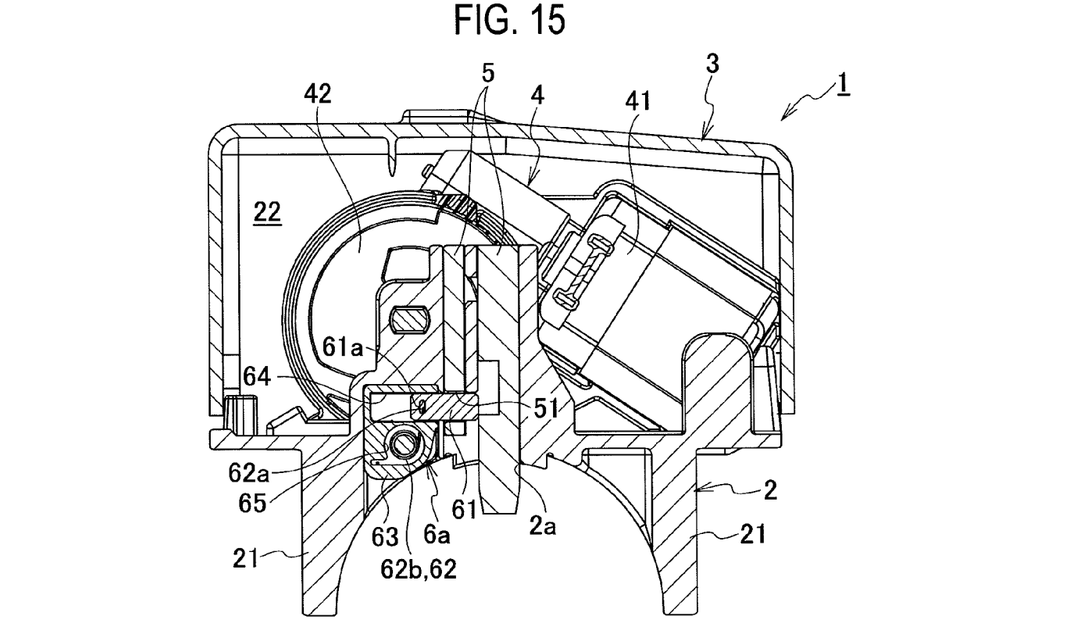
FIG. 15 is a cross-sectional view taken along line C-E in FIG. 8, illustrating the state after actuating the auxiliary lock structure.

Next, the operation of the auxiliary lock structure 6 will be described. First, as illustrated in FIGS. 12 and 13, in a state where the auxiliary lock member 61 is located in the auxiliary lock release position with the trigger engaging portion 62a of the auxiliary biasing unit 62 engaged with the tip of the trigger 31, the auxiliary lock member 61 is not engaged with the lock member 5; thus, the lock member 5 can be moved between the lock position and the lock release position with the driving force of the driving unit 4. As illustrated in FIGS. 14 and 15, upon an improper unlocking action or the like during the state where the lock member 5 is located in the lock position, the cover 3 falls from the frame 2; thus, the trigger 31 falls from the trigger inserting hole 26, thereby releasing the engagement between the trigger engaging portion 62a and the tip of the trigger 31. Once the engagement between the trigger engaging portion 62a and the tip of the trigger 31 is released, the auxiliary lock member 61 moves from the auxiliary lock release position to the auxiliary lock position with the biasing force of the auxiliary biasing unit 62, and the tip of the auxiliary lock member 61 comes into engagement with the auxiliary lock engaging portion 51. This prevents any movement of the lock member 5 toward the lock release position and held the lock member 5 in the lock position.

The steering lock device 1 of this embodiment having the above-described structure must receive excessively large force around the lock accommodating hole 23 when excessively large force that tries to turn the steering shaft is applied in the state where the lock member 5 is located in the lock position, restricting turn of the steering shaft. For this reason, in the case of providing the unit accommodating chamber 24 around the lock accommodating hole 23 for arranging the auxiliary lock structure 6, a dimension L1 must be as small as possible. However, in the case of the conventional structure in which a coil spring as an auxiliary biasing unit is arranged on a side surface of an auxiliary lock member, the dimension L1 is the sum of the tube diameter of the coil spring and the thickness of the auxiliary lock member, and is therefore large.

On the other hand, in the steering lock device 1 of this embodiment, the structure is such that the tip of the trigger 31 is engaged with the trigger engaging portion 62a of the torsion coil spring, which is the auxiliary biasing unit 62, to thereby hold the auxiliary lock member 61 in the auxiliary lock release position. In this way, the dimension L1 of the opening portion of the unit accommodating chamber 24 can be made smaller. Moreover, in this embodiment, the torsion coil spring as the auxiliary biasing unit 62 is arranged on the same plane as the same on which the auxiliary lock member 61 slides. In this way, the auxiliary biasing unit 62 or the auxiliary lock member 61 can be arranged only with the thickness of the auxiliary biasing unit 62 or the auxiliary lock member 61. Accordingly, the dimension L1 can be made small. Since these structural features can make the dimension L1 of the opening portion of the unit accommodating chamber 24 small, it is possible to include the auxiliary lock structure 6 without decreasing the strength of the frame 2.

Moreover, the structure is such that the spring linkage portion 61a provided to the auxiliary lock member 61 is formed as an elongate hole extending perpendicularly to the sliding direction of the auxiliary lock member 61, and the one end of the torsion coil spring is engaged with the spring linkage portion 61a in the front-rear direction with respect to the sliding direction of the auxiliary lock member 61. This prevents the possibility that the auxiliary lock member 61 may shift to the auxiliary lock position depending upon the direction in which the steering lock device 1 is mounted to the steering shaft. Accordingly, there is no restriction on the direction in which the steering lock device 1 is mounted.

Further, the structure is such that a torsion coil spring is used as the auxiliary biasing unit 62, and the auxiliary biasing unit 62 is arranged on the same plane as the plane on which the auxiliary lock member 61 slides. In this way, the spring linkage portion 61a can be set at the rear end side of the auxiliary lock member 61, and a distance L2 between the trigger inserting hole 26 and the lock accommodating hole 23 can be widened. Accordingly, the strength of the frame 2 against destructive actions can be enhanced.

Figure 16:
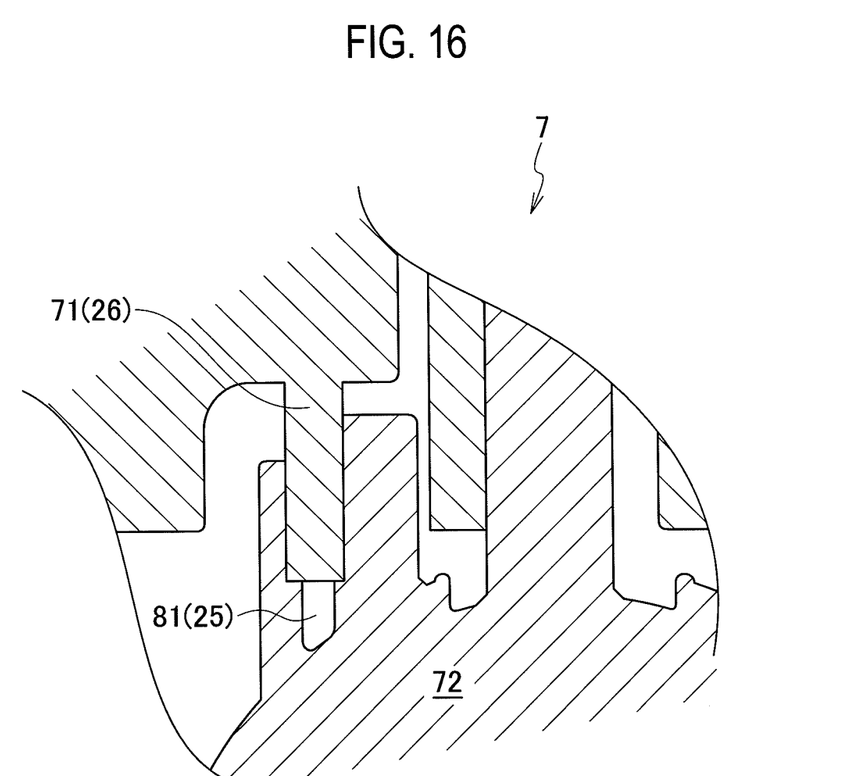
FIG. 16 is a main-part enlarged view illustrating a portion of a die corresponding to the cross section taken along line A-A in FIG. 6.

The unit locking protrusion 25 is set on an extension of the trigger inserting hole 26 in the unit accommodating chamber 24. Thus, as illustrated in FIG. 16, in a die 7 for casting the frame 2, a cavity portion 81 for forming the unit locking protrusion 25 is set between the tip of an inserting hole forming portion 71 for forming the trigger inserting hole 26 and the other die half 72. For this reason, the unit locking protrusion 25 can be formed without using a complicated and expensive die. Accordingly, it is possible to include the auxiliary lock structure 6 while suppressing increase in manufacturing cost.

For example, suppose a structure in which a through-hole (not illustrated) connecting the unit accommodating chamber 24 and the component accommodating chamber 22 is provided, and a locking claw (not illustrated) is hooked on the edge of the opening of the through-hole on the component accommodating chamber 22 side to fix the unit case 63 in the unit accommodating chamber 24. In this case, the number of holes penetrating the frame 2 increases, thereby decreasing the strength of the frame against destructive actions and also increasing the likelihood of becoming a target of destructive actions. However, in the case of the structure in which the unit locking protrusion 25 is formed inside the unit accommodating chamber 24, and the unit case 63 is locked on the unit locking protrusion 25, as described in this embodiment, the through-hole for fixing the unit case 63 is not necessary. Accordingly, it is possible to prevent the decrease in the frame strength against destructive actions, and also reduce the likelihood of becoming a target of destructive actions.

Moreover, since the unit locking protrusion 25 extends from the predetermined portion inside the unit accommodating chamber 24 to the edge of the opening thereof on the one surface side, the strength of the unit locking protrusion can be enhanced without making the die for molding the unit locking protrusion 25 complicated.

The foregoing descriptions have been provided on the basis of the embodiment of the present invention. However, the present invention is not limited to this. The configuration of each component may be replaced with an arbitrary configuration which has the same function.

The entire content of Japanese Patent Application No. 2012-102963 (filed on Apr. 27, 2012) is herein incorporated by reference.

The invention claimed is:

1. A steering lock device, comprising:
a frame having a lock accommodating hole being a through-hole;
a lock member arranged in the lock accommodating hole and configured to shift between a lock position to prevent a rotation of a steering shaft and a lock release position to allow the rotation of the steering shaft; and
an auxiliary lock structure configured to prevent a shift of the lock member,
wherein the auxiliary lock structure comprises
an auxiliary lock member arranged inside the frame and configured to shift between an auxiliary lock position to engage with the lock member and prevent the shift of the lock member and an auxiliary lock release position to allow the shift of the lock member, an auxiliary biasing unit configured to bias the auxiliary lock member from the auxiliary lock release position toward the auxiliary lock position, and
a trigger provided on an inner surface of a cover mounted to the frame, the trigger being engageable and disengageable with the auxiliary biasing unit, the trigger engaged with the auxiliary biasing unit holding the auxiliary lock member in the auxiliary lock release position,
wherein the auxiliary lock member is configured to move to the auxiliary lock position upon falling of the trigger and release of the engagement between the trigger and the auxiliary biasing unit,
wherein the auxiliary biasing unit is a torsion coil spring,
wherein the auxiliary lock member comprises a through hole, and
wherein a tip of one end of the torsion coil spring penetrating the through hole engages with the trigger.

2. The steering lock device according to claim 1, wherein the torsion coil spring comprises a coil portion arranged on a same plane as a plane on which the auxiliary lock member slides.

3. The steering lock device according to claim 2, wherein the one end of the torsion coil spring and the through hole are in front-rear engagement with each other in a sliding direction of the auxiliary lock member.

4. The steering lock device according to claim 3, wherein the through hole is an elongate hole extending perpendicularly to the sliding direction of the auxiliary lock member.

* * * * *